United States Patent [19]

Peltier

[11] 4,135,940
[45] Jan. 23, 1979

[54] LIGHTWEIGHT MATERIAL COMPRISING PORTLAND CEMENT, LIME, SAND, A COLLOID AND AN AIR ENTRAINING AGENT

[76] Inventor: Raymond Peltier, 11 Square Jasmin, Paris, France, 75016

[21] Appl. No.: 860,174

[22] Filed: Dec. 13, 1977

[30] Foreign Application Priority Data

Dec. 17, 1976 [FR] France .................. 76 38093

[51] Int. Cl.² ............................................. C04B 7/02
[52] U.S. Cl. ....................................... 106/88; 106/98; 106/118; 264/42; 264/82
[58] Field of Search ................. 106/88, 93, 98, 118, 106/119; 264/42, 82

[56] References Cited

U.S. PATENT DOCUMENTS

| 3,788,869 | 1/1974 | Batdorf et al. | 106/93 |
| 3,926,650 | 12/1975 | Lange et al. | 106/88 |
| 3,963,507 | 6/1976 | Kuramoto et al. | 106/93 |

FOREIGN PATENT DOCUMENTS

1105623  3/1968  United Kingdom ............ 106/93

*Primary Examiner*—James Poer
*Attorney, Agent, or Firm*—John J. Dennemeyer

[57] ABSTRACT

The present invention relates to a lightweight material comprising Portland cement, a colloid, an air entraining compound and lime. This material is manufactured by effecting a vigorous mixing during which high proportions of air are taken up in the mixture to obtain a controlled and predetermined density.

14 Claims, No Drawings

LIGHTWEIGHT MATERIAL COMPRISING PORTLAND CEMENT, LIME, SAND, A COLLOID AND AN AIR ENTRAINING AGENT

The present invention concerns a material of the type comprising a Portland cement, lime, sand, a colloid and an air entraining agent. Such a material may, for example, be a lightweight colloidal concrete.

A concrete material of this type comprising cement, sand, a colloid, an air entraining complex and water are well known. Because of the high viscosity obtained by the action of the colloid in water, the agent which entrains or takes up air causes during the mixing of the concrete, the formation of a network of very numerous, small and closed air bubbles in the plastic paste. This concrete material has the properties of a lightweight concrete wherein the bubbles substitute for the usual light granulates.

With reference to the prior art known to us, the U.K. Pat. No. 1,105,623 concerns a cement mortar having the following composition, by weight:

| | |
|---|---|
| Perlite or vermiculite | 18.9% |
| filler | 28.34% |
| hydrated lime | 7.14% |
| cement | 45.62% |
| cellulose ether | 0.0075% |
| surface active air entraining agent | 0.032% |

In the Dutch publication 67 15 986 a mortar is described which comprises for example:

| | |
|---|---|
| sand having a grain size below 1 mm | 53.9% |
| quicklime | 8.4% |
| hydrated lime | 5.4% |
| Portland cement | 13.5% |
| trass | 13.5% |
| methyl cellulose and powdered asbestos | 0.5% |
| polyvinyl acetate | 4.7% |

In the West German publication No. 2,046,046 is described a sand and lime based plastering mortar comprising:

| | | |
|---|---|---|
| 750 | g | of sand |
| 130 | g | of hydraulic lime |
| 40 | g | of dolomitic lime |
| 80 | g | of ground clinker |
| 1.3 | g | of methyl cellulose |
| 1.5 | g | of a thixotropic agent |
| 1.5 | g | of a porosity increasing agent |
| 0.5 | g | of a dispersion agent |
| 5% by volume of a lightweight aggregate. | | |

In these publications the amount of lime present in the composition is relatively limited.

The lightweight colloidal concrete, in spite of all its advantages, presents nevertheless the drawback of being expensive, particularly when it must be manufactured and used on sites far removed from any cement manufacturing facilities. Indeed, such a concrete comprises at least 500kg of cement per cubic meter which sometimes have to be transported over long distances and at difficult conditions.

It is an object of the present invention to overcome these drawbacks. In this connection, the lightweight colloidal concrete of this invention comprising at least a Portland cement, a colloid and an air entraining agent includes also lime.

Indeed, it is known that lime is a product easy to manufacture and one which does not need heavy equipment. Furthermore this raw material is very abundant. Therefore, in replacing a portion of the cement utilized hitherto in the manufacture of the lightweight colloidal concrete by lime which may be manufactured near the site of manufacturing the concrete, the cost of this new type of concrete is substantially lowered.

The material according to the invention is characterized in that it is obtained by a vigorous mixing so as to take up or entrain great proportions of air to obtain a controlled and predetermined density.

Of course that material may also comprise other additives such as lightweight granulates, expanded clays, sand and/or fibers.

The lightweight colloidal concrete according to the invention may, for example, comprise between one to three parts of lime for one part of Portland cement.

Indeed, it has been noticed that this lightweight colloidal concrete kept its excellent physical and mechanical properties even if a high proportion of cement is replaced by lime.

The lime used for the manufacture of this concrete may be pure slaked lime or a hydraulic lime of any composition.

The present invention concerns also a process for carrying out the lightweight material described hereabove.

According to this process, the carbonation of the slaked lime is accelerated in bringing the product obtained from this concrete in contact with an atmosphere with a high content in carbon dioxide gas ($CO_2$).

In the West German Pat. No. 68,638 is described a process for accelerating the setting of cement base materials containing lime by submitting these materials to the action of carbon dioxide gas to carbonate the lime. Indeed, it is known that the presence of lime in concrete impedes the setting of the latter until the carbonatation of the lime has been carried out. It has been established that this is true particularly in the case of lightweight colloidal concrete and that the carbonatation in air progresses slowly. On the other hand in an atmosphere rich in carbon dioxide this carbonation is performed much more rapidly.

In one embodiment for carrying out the process this contact is obtained by keeping the products in a carbon dioxide gas. Due to the porosity of the material this contact is particularly intimate and permits a complete carbonation to the contrary of what is generally obtained with the usual much more compact concretes where the carbonation progresses only very slowly from the surface of the material.

The carbon dioxide gas may be obtained for example from the lime kilns in which is manufactured the slaked lime used for the preparation of the concrete according to the invention, or this carbon dioxide gas may be obtained from any other suitable source.

In general, after a conservation of a few days in carbon dioxide gas, the concrete has acquired nearly the final properties shown hereafter.

In another embodiment for carrying out the present invention, the contact is carried out by mixing the concrete in an atmosphere containing a certain percentage of carbon dioxide gas which is thus taken up and forms bubbles in the bulk concrete. This embodiment has the advantage that it is not necessary to provide sealed enclosures to keep therein the finished products for some time. The manufacture is thus simplified, particularly when buildings are concerned.

An embodiment of the present invention will now be described, the test results being shown in the appended table 1.

This table discloses, for different samples tested, the density as well as the tensile-bending strength (TBS) and the compressive strength (CS) indicated in kg/cm².

For manufacturing the novel concrete, a mixture in equal parts by weight of 0–0.7 mm fine sand and a hydraulic binder comprising partially CPA 400 cement and partially lime has been used.

The mixing water contained, as air entraining agent 0.7% by weight of the hydraulic binder of sodium alkyl ethoxy sulfate, sold under the trademark SIKA AER by the SIKA Company.

The cement has previously been homogenized with 0.3% of a colloid. The colloid used was hydroxypropylmethyl cellulose, sold under the trademark METHOCEL K 15 by the DOW-CHEMICAL Company.

The mixing is carried out in a conventional concrete mixer especially adapted to the manufacture of this material.

Samples have been prepared by using on the one hand as hydraulic binder pure CPA 400 cement and on the other hand by mixing respectively 50%, 60%, 70% and 80% lime. In each of these five cases, the weight ratio of mixing water to hydraulic binder is indicated in the table.

The results given on line 1 of the table correspond to samples kept for two days in air at 20° C., having a relative humidity of 100%.

The lines 2 and 3 of the table correspond to samples kept for 7 days and 28 days, respectively, in air at 20° C. having a relative humidity of 50%.

The lines 4 and 5 of the table concern samples kept for 2 days in air at 20° C. having a relative humidity of 100% and thereafter for 9 days and 26 days, respectively, in a carbon dioxide atmosphere at 20° C.

It will be noticed that in the absence of a process permitting an accelerated carbonation, the properties of the different concretes obtained are improved only slowly with time, the properties of the samples comprising an important percentage of lime being in any case rather mediocre with respect to the properties of the concrete obtained with pure cement during a defined period of time.

On the other hand, in accelerating the carbonatation, the properties become rapidly good and are nearly as good as those of the concrete obtained with pure cement.

It will be understood that the invention is not limited to the embodiments described herein merely as examples, and accordingly it comprises all embodiments falling within the scope of the appended claims.

loid and an air entraining compound obtained by vigorous mixing of the components taking up high proportions of air to obtain a controlled and predetermined density, wherein said material contains an equal or greater proportion of lime than Portland cement, said material having been subjected to carbonation by exposure to an atmosphere containing a high content of carbon dioxide.

2. Lightweight material according to claim 1, wherein the material is a concrete and the mixture, to which water is added, is vigorously stirred during a predetermined time.

3. Lightweight material according to claim 1, wherein to the mixture supplied with water is added a foam material.

4. Lightweight material according to claim 1, wherein said lime is slaked lime.

5. Lightweight material according to claim 1, wherein said lime is hydraulic lime.

6. Lightweight material according to claim 1, wherein the proportion of lime to Portland cement is between one to three parts of lime per one part of Portland cement.

7. Lightweight material according to claim 1, further comprising additives selected from the group consisting of lightweight granulates, expanded clays, sand, fibers and mixtures thereof.

8. A process for preparing a lightweight concrete material comprising Portland cement, lime, sand, a colloid and an air entraining agent comprising:
   i. vigorously stirring a mixture of cement, sand, and a colloid in water in the presence of slaked or hydraulic lime, said stirring being maintained during a period of time sufficient for taking up high proportions of air to obtain a controlled and predetermined density, wherein said mixture contains an equal or greater proportion of lime than cement; and,
   ii. carbonating the lime by contacting the material with an atmosphere having a high content of carbon dioxide.

9. Process according to claim 8, wherein the contact is obtained by keeping the products in carbon dioxide gas for a predetermined period.

10. Process according to claim 8, wherein the contact is obtained by mixing the concrete in a carbon dioxide gas atmosphere, said gas being thus taken up and forming bubbles in the bulk concrete.

11. Process according to claim 8, wherein the material is molded for fabricating concrete blocks.

12. Process according to claim 8, wherein the material is extruded for fabricating molded pieces.

13. Process according to claim 8, wherein the material is sprayed on a self-supporting grid.

14. Process according to claim 13, wherein the car-

TABLE 1

| | Pure CPA 400 W/B=0.42 | | | 50% CPA 400 + 50% lime W/B =0.50 | | | 40% CPA 400 + 60% lime W/B=0.592 | | | 30% CPA 400 + 70% lime W/B=0.705 | | | 20% CPA 400 + 80% lime W/B=0.792 | | |
|---|---|---|---|---|---|---|---|---|---|---|---|---|---|---|---|
| | density | TBS | CS | density | TBS | CS | density | TBS | CS | density | TBS | CS | density | TBS | CS |
| 1 | 1.12 | 13 | 34 | 1.59 | 14 | 44 | 1.53 | 7 | 15 | 1.45 | 0 | 4 | 1.53 | 0 | 0 |
| 2 | 1.06 | 19 | 64 | 1.40 | 27 | 92 | 1.29 | 16 | 41 | 1.14 | 7 | 12 | 1.12 | 6 | 7 |
| 3 | 1.06 | 20 | 71 | 1.40 | 23 | 104 | 1.29 | 16 | 49 | 1.16 | 9 | 19 | 1.20 | 5 | 9 |
| 4 | 1.14 | 32 | 104 | 1.57 | 62 | 129 | 1.45 | 40 | 137 | 1.32 | 32 | 94 | 1.30 | 30 | 96 |
| 5 | 1.14 | 33 | 110 | 1.58 | 70 | 245 | 1.45 | 43 | 148 | 1.32 | 30 | 96 | 1.34 | 31 | 100 |

What is claimed is:

1. A lightweight concrete material comprising Portland cement, slaked or hydraulic lime, sand, a colbonatation is performed by incorporating the carbon dioxide gas in the body of the material.

* * * * *